(12) United States Patent
Coleman et al.

(10) Patent No.: US 11,146,022 B2
(45) Date of Patent: Oct. 12, 2021

(54) COMBINATION LOADBREAK AND DEADBREAK TEMPORARY GROUNDING DEVICE

(71) Applicant: Meta Design & Manufacturing, Inc., Vallejo, CA (US)

(72) Inventors: James W. Coleman, Benicia, CA (US); Aaron Boone, Benicia, CA (US); Bradley T. Sykes, Mill Valley, CA (US); Philip Hawtin, Lodi, CA (US)

(*) Notice: Subject to any disclaimer, the term of this patent is extended or adjusted under 35 U.S.C. 154(b) by 0 days.

(21) Appl. No.: 16/947,552

(22) Filed: Aug. 6, 2020

(65) Prior Publication Data

US 2021/0044056 A1 Feb. 11, 2021

Related U.S. Application Data

(60) Provisional application No. 62/883,571, filed on Aug. 6, 2019.

(51) Int. Cl.
| | |
|---|---|
| *H01R 13/53* | (2006.01) |
| *H01R 24/20* | (2011.01) |
| *H01R 4/56* | (2006.01) |
| *H01R 13/648* | (2006.01) |
| *H01R 101/00* | (2006.01) |

(52) U.S. Cl.
CPC .............. *H01R 13/53* (2013.01); *H01R 4/56* (2013.01); *H01R 13/648* (2013.01); *H01R 24/20* (2013.01); *H01R 2101/00* (2013.01)

(58) Field of Classification Search
CPC ................ H01R 13/53; H01R 13/6485; H01R 13/6666; H01R 13/703; H01R 23/6873; H01R 13/7036
USPC .......................................... 439/181, 187, 921
See application file for complete search history.

(56) References Cited

U.S. PATENT DOCUMENTS

| | | | |
|---|---|---|---|
| 6,283,571 B1* | 9/2001 | Zhou ..................... | B41J 2/2056 347/15 |
| 7,384,287 B2* | 6/2008 | Hughes ................. | H01H 9/085 439/181 |
| 7,695,291 B2* | 4/2010 | Hughes ................. | G01R 31/74 439/88 |
| 7,972,155 B1* | 7/2011 | Siebens ................. | H01R 13/53 439/181 |
| 9,124,050 B2* | 9/2015 | Siebens ................. | H01R 11/15 |
| 9,350,103 B2* | 5/2016 | Siebens ................ | H01R 13/447 |

\* cited by examiner

*Primary Examiner* — Phuong Chi Thi Nguyen

(57) ABSTRACT

A combination loadbreak and deadbreak temporary grounding device that includes a conductive body configured to accept a grounded bushing well; a grounded bushing well disposed through the body and having an inner end configured to slip onto a loadbreak mounting clip on a loadbreak mounting bracket and an outer end configured to accept either a loadbreak bushing or a deadbreak bushing for coupling, respectively, to either a loadbreak or deadbreak elbow connector; and a grounding cable electrically connected to the conductive body.

17 Claims, 3 Drawing Sheets

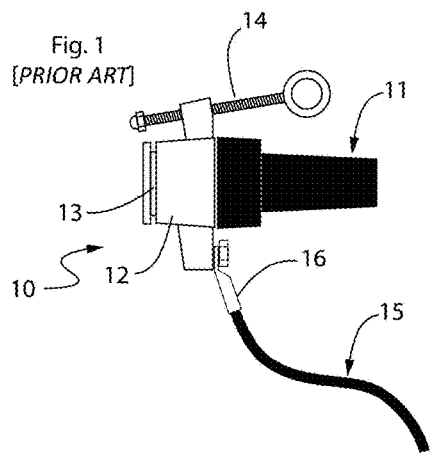
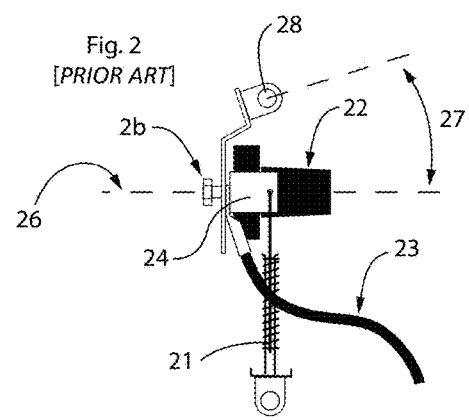
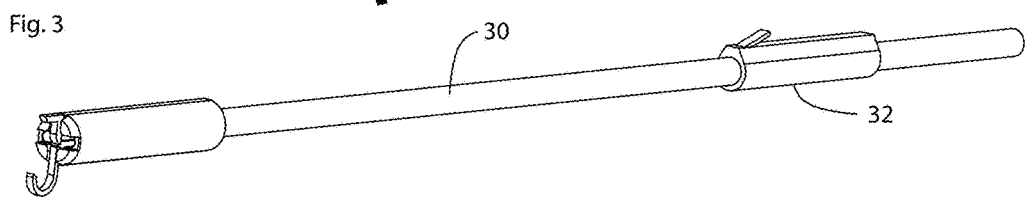
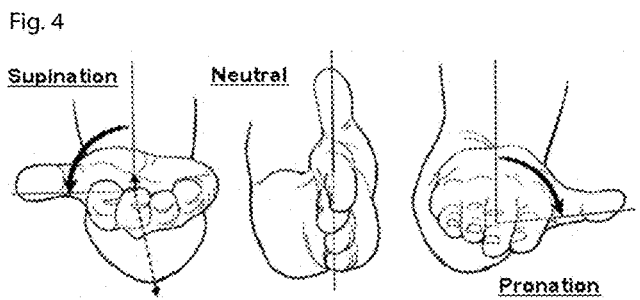
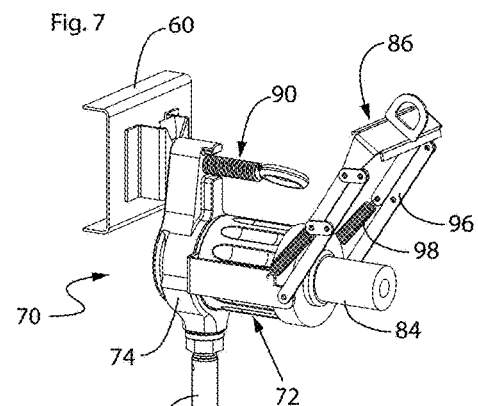
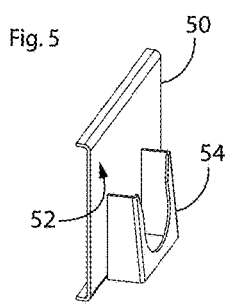
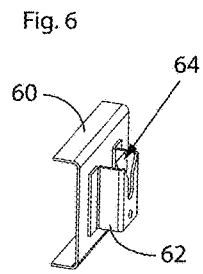

COMBINATION LOADBREAK AND DEADBREAK TEMPORARY GROUNDING DEVICE

CROSS REFERENCES TO RELATED APPLICATIONS

The present application claims the benefit of the filing date of U.S. Provisional Patent Application Ser. No. 62/883,571, filed Aug. 6, 2019 (Aug. 6, 2019), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention: The present invention relates most generally to tools for use in medium to high power electrical distribution systems, and more particularly to devices for grounding medium to high voltage electrical distribution transformers and switches, and still more particularly to an ergonomically advantageous temporary grounding device that facilitates connection and disconnection of temporary grounding safety devices for separable dead break and load break elbow cable connectors in the underground and pad-mounted transformers and switches of power distribution systems.

Background Discussion: For the safety of electrical linemen, the construction, maintenance, and repair of privately owned or utility owned underground and pad-mounted electric distribution systems require that the line(s) be de-energized and have temporary grounding safety device(s) installed before any work proceeds. Therefore, to avoid unwanted disruptions to power, it is preferred that maintenance workers disconnect loads without interrupting service to downstream equipment and customers.

In the underground and pad-mounted environment, two types of underground separable connectors are used for 200 Amp underground cables: (1) loadbreak separable connectors (FIG. 1); and (2) deadbreak separable connectors (FIG. 2) [both denominated in the respective views as "Prior Art" devices]. The loadbreak connectors are used when an equipment owner requires the connection to be separated under load, while deadbreak connections must be fully de-energized before separation. Because both types of connectors may be present in underground cable systems, construction crews must carry discrete temporary grounding devices, each having one of the two types of connectors. These temporary grounding devices comprise either a loadbreak or a deadbreak connector attached to a grounding cable. The grounding cable, in turn, is connected to a ground clamp. After an underground cable is verified to be de-energized, the permanent (operating) connection is separated and a temporary grounding device is installed to connect the cable to ground. This protects personnel in the event the cable is inadvertently energized (see, e.g., FIGS. 1, 2, and 7).

FIG. 1 and FIG. 2 show prior art loadbreak and deadbreak temporary grounding devices, 10 and 20, respectively. As can be seen by reference to FIG. 1, a loadbreak bushing 11 is coupled to a housing 12 (typically a cast aluminum body) having an interior annular channel 13 sized for slidable insertion into and onto an open loadbreak bracket 50 (FIG. 5). The brackets do not provide electrical connection for grounding, but instead provide a sturdy interface that enables installation of a grounding device component, such as a grounded bushing well, which can be pushed onto the bracket with significant force to provide a friction fit. When installed in the bracket, an eye screw 14 is turned into the bracket face 52 to engage the bracket and urge the loadbreak bushing tightly against the bracket shoe or mounting clip 54. When so installed, a ground cable 15 terminated in a crimp style ring terminal 16 provides a conductive connection to ground.

Grounding devices are installed by a lineman using a "hotstick" (FIG. 3). As part of the required personnel protective equipment, linemen wear special leather-covered rubber gloves that prevent the passage of current at the voltages encountered (FIG. 8). Using a dielectric external rod clampstick, or hotstick 30, of the kind shown in FIG. 3, existing grounding devices require up to fifteen 90-degree rotations of the hotstick handle 32 to secure the device to a standard transformer or switching apparatus mounting bracket. Reverse motions are required to loosen the device for removal. Looking at FIG. 8, one will readily appreciate the kinds of repetitive motions required and the forces needed to secure the conventional device (though, as will be explained, such repetitive motions are obviated when using the present invention). Combinations of repeated supination and pronation of the hand, originating at the elbow, as well as circumduction, flexion and extension, and to a lesser degree radial and ulnar flexion, all originating at the wrist, are required, and all applied with considerable force. These repetitive motions place considerable strain on the arms and wrists of the user.

A deadbreak temporary grounding device 20 for an underground transformer or switchgear uses a spring-loaded camming bail 21, typically made of wire spring that prevents it from dislodging from a deadlock bushing 22. The ground cable 23 is again terminated on the housing 24. Standard deadbreak junction brackets on sub-surface equipment include a deadbreak mounting bracket 60 having an open mounting clip 62. The mounting clip 62 is sized to accommodate an axially-oriented mounting bolt 25 on the housing 24 (see, again, FIG. 2), and the interior surface 64 of the mounting clip includes a small leaf spring designed to engage the mounting bolt so as to secure the temporary ground and prevent it from dislodging from the mount. However, these structures have proven to be less than entirely reliable, as the spring can wear and loosen. Indeed, existing deadbreak grounding devices rely solely on gravity and the leaf spring for capturing the temporary ground device; they do not include structure to tightly secure the device to the mounting bracket. Furthermore, the mounting bolt 25 is located on the backside of the housing on the axis 26 of the housing and bushing, as it must be; yet it is positioned a distance and at an angle 27 offset or nonconcentric to the point 28 at which the hotstick connects. This configuration conceals the mounting bolt, out from of the line of sight of the lineman or operator. This offset position makes it difficult to "land" the device on a target mounting clip, often requiring several frustrating attempts. In consequence, linemen will frequently decline to use the bracket, and instead enlist a second lineman to hold the elbow with another hotstick while the first lineman secures the ground to it, thereby leaving the connection on the deck. This further increases the potential hazards and is therefore not a responsible method for handling a 12 kV cable connection.

The foregoing prior art devices reflect the current state of the art of which the present inventors are aware. Reference to, and discussion of, these devices is intended to aid in discharging Applicants' acknowledged duties of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention improves the safety, operability, and convenience of temporary grounding devices in several ways. Among its many advantages, the inventive device increases safety, reduces fatigue, increases efficiency in installing the devices in the field, reduces overuse injuries, increases connection strength, reduces operational costs, reduces the number of grounding devices needed on-site, and reduces labor time.

The inventive device achieves the safety and ergonomic advantages by combining the two types of temporary grounding devices into single device configurable for either loadbreak or deadbreak connectors. This drastically simplifies the tooling that crews must carry for work on underground electric systems.

Current manufacturers produce variations on the components for either loadbreak or deadbreak temporary grounds. In consequence, devices presently available for use most often require two linemen for safe installation. There is as yet no integrated solution that achieves the advantageous features present in the grounding device of the present invention, best seen by reference to FIG. 7.

Using the present invention, a single temporary grounding device can be easily configured at the job site for either loadbreak or deadbreak applications. The configuration of the combination loadbreak and deadbreak temporary grounding device enables a grounded bushing well to be safely and easily installed by one lineman.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof, which makes reference to the annexed drawings wherein:

FIG. 1 is schematic side view in elevation of a prior art loadbreak separable connector;

FIG. 2 is a schematic side view in elevation of a prior art deadbreak separable connector;

FIG. 3 is a perspective view showing an external rod clampstick (aka, a hot stick) used for disconnecting and connecting separable connectors and temporary ground devices;

FIG. 4 is an anterior distal end view of a forearm, showing some wrist movements involved in using the hot stick of FIG. 3 for the operations indicated;

FIG. 5 is an upper perspective view of a loadbreak bushing mounting bracket;

FIG. 6 is an upper perspective view of a deadbreak bushing mounting bracket;

FIG. 7 is an upper perspective view of the combination loadbreak and deadbreak grounded well for temporarily grounding high voltage sub-surface power distribution equipment;

DETAILED DESCRIPTION OF THE INVENTION

Figure 8:
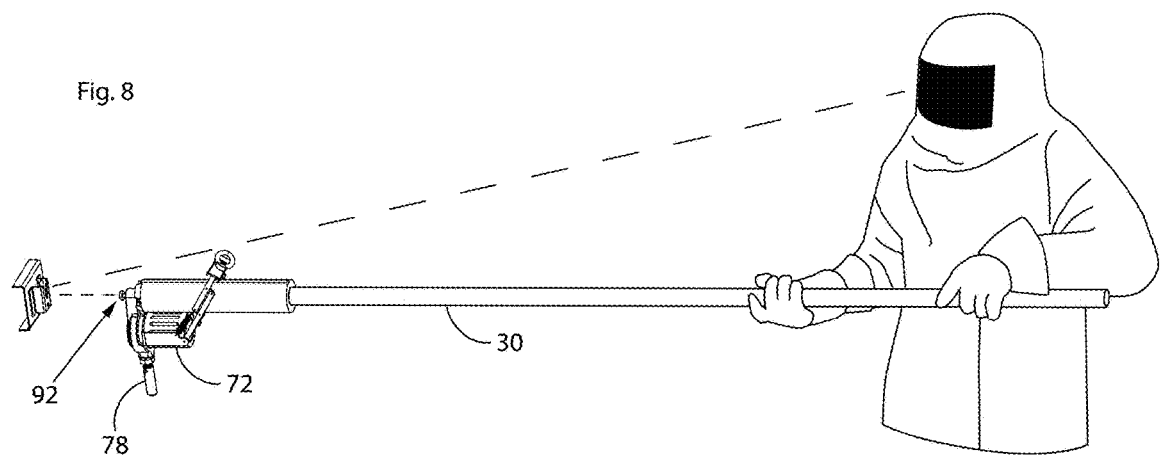
FIG. 8 is an upper side view showing an operator manipulating a hotstick during installation of the grounded bushing well of the present invention.
Figure 9:
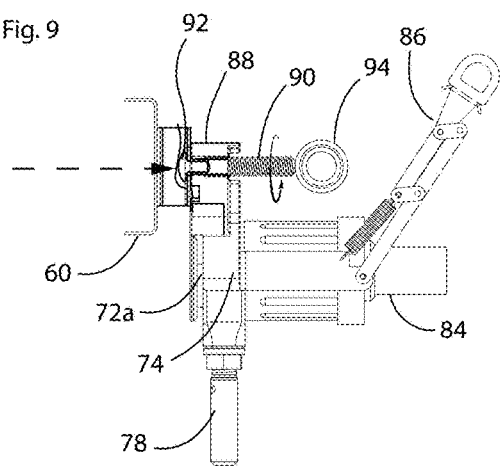
FIG. 9 is a left side view in elevation showing the ground bushing well configured with a deadbreak bushing installed on a deadbreak mounting clip on sub-surface equipment interface.
Figure 10:
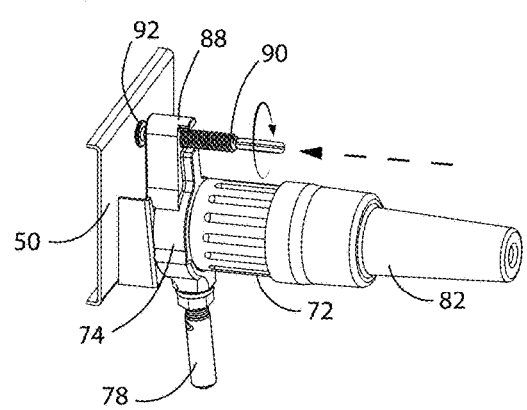
FIG. 10 is an upper perspective view showing the grounded bushing well configured with a loadbreak bushing and installed on a loadbreak mounting clip.
Figure 11:
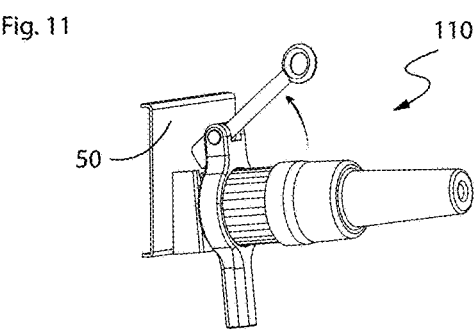
FIG. 11 is an upper perspective view showing the grounded bushing well configured with a pivotally connected coupling screw.
Figure 12:
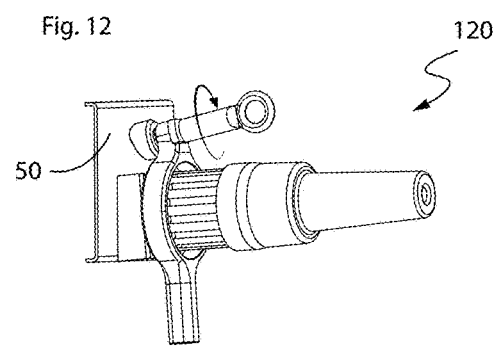
FIG. 12 shows another alternative embodiment of the ground bushing well having an angled coupling screw.
Figure 13:
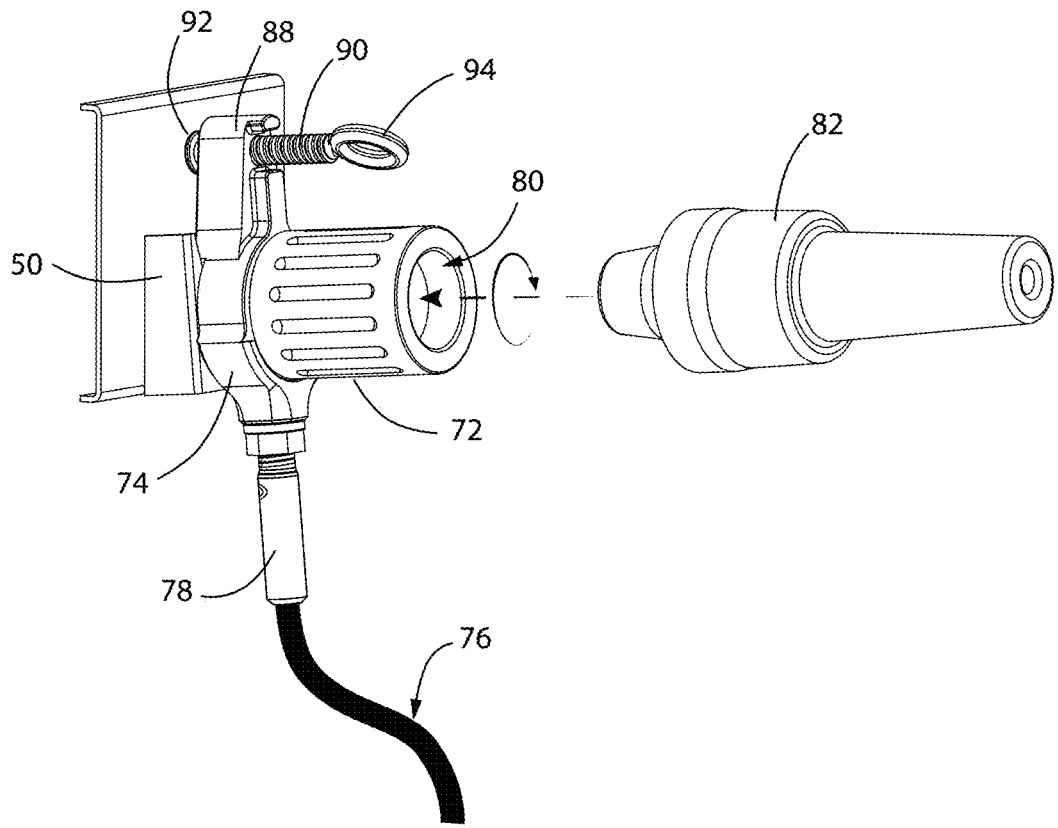
FIG. 13 is a left side perspective view showing how a loadbreak bushing is installed in the grounded bushing well.
Figure 14:
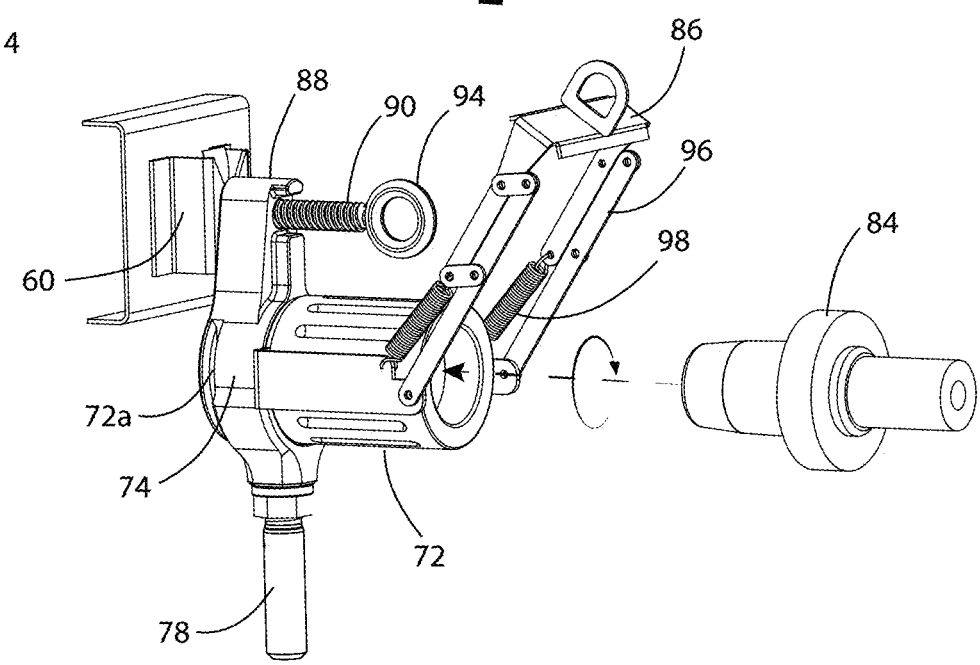
FIG. 14 is the same perspective showing a deadbreak bushing and spring-loaded clamp installed on the groundwell bushing and installed on a deadbreak mounting clip.

Referring now to FIGS. 4 through 14, wherein like reference numerals refer to like components in the various views, prior art devices and background information as well as the new and improved ergonomic grounded bushing well of the present invention are shown, the inventive grounding device generally denominated 10 herein.

The inventive combination loadbreak and deadbreak temporary grounding device of the present invention 70 comprises a grounded bushing well 72 disposed through a conductive body 74, such as a monolithic machined aluminum body. The grounded bushing well is preferably inserted into and through and rotatingly coupled to body. The conductive body 74 includes a cylindrical passage or opening for passing the inboard end of the grounded bushing well entirely through the body. The body is fabricated from dielectric material, such as ethylene propylene diene monomer rubber (EPDM). The inboard (interface) end of the grounded bushing well extends through the body and includes an annular channel 72a for slipping into a loadbreak mounting clip 54 on a loadbreak mounting bracket 50.

The body 74 is electrically connected to a grounding cable 76 through a machined copper ferrule 78, preferably connected to the body with a threaded fitting, though suitable alternatives are well known and serviceable.

The grounded bushing well next includes an outer end 80, which is an open cylindrical end that accommodates either a loadbreak bushing well insert 82 or a deadbreak bushing well insert 84, each adapted with an interface for mounting a connecting elbow when a protective cap or plug is removed. When a deadbreak bushing well insert is installed onto the grounded well bushing, a camming spring-loaded bail or locking arm 86 is used to secure a deadbreak elbow connector to the bushing well insert when the deadbreak elbow connector is installed onto the end of the deadbreak bushing well insert. The selective insertion of either the loadbreak bushing well insert 82 or deadbreak bushing well insert 84 simply entails the insertion of a male element into the open cylindrical end 80 of the grounded bushing well 72. The bushing well insert is configured with locking structure complementary to locking structure in the grounded bushing well such that it is selectively secured in the grounded bushing well with turns in a locking direction and removed with turns in an unlocking direction (FIGS. 13-14), in a manner well known in relevant art. Again, the bail simply provides a fail-safe connection for a deadbreak elbow connector when using the deadbreak bushing well insert.

The vertex 88 of the device body 74 is formed as an integral boss having a threaded bore for passing a threaded eye bolt 90 having a head 92 that engages a mounting bracket when the bolt is tightened using the hotstick to engage the eye end 94 (either CW for the loadbreak bushing configuration or CCW for the deadbreak configuration). Advantageously, the grounding device can be rapidly secured to a bracket with significantly fewer rotations by a lineman using a high speed thread pitch requiring only five turns to secure and remove the device. This feature is critical to reducing fatigue and overuse injuries and to increasing efficiency.

The bail 86 employed in the deadbreak configuration includes a combination of a plate stainless steel linkage 96 and a tensioning spring 98. Testing shows that the bail holds a deadbreak elbow connector with minimal damage while devices in current use failed (i.e., snapped), failing to secure the elbow in place.

Referring now to FIG. 8, the grounding device has an improved ergonomic configuration, wherein the eye bolt that mounts to the deadbreak mounting clip does so in direct line of sight of the lineman and axially aligned with the axis of the hotstick, thus making the act of landing the device on the bracket target significantly easier. Landing the grounding well when configured with a loadbreak bushing (see FIG. 10) is nearly as easy.

Note that the threaded fastener rotates counter-clockwise (FIG. 9) to secure the grounded bushing well to a deadbreak mounting clips and clockwise (FIG. 10) to secure to loadbreak mounting clips. In each case the temporary grounds are positively secured to the intended mounting clip, eliminating the need for assistance from a second lineman and improving safety by minimizing potential hazards.

Due to the improved design, the tasks required to ground underground electric cables, typically requiring two different temporary grounding devices, can be completed with only one grounded bushing well. The result is a reduction in operating costs and further improving efficiency and a safer installation. The dual function is made possible by configuring the grounded bushing well to accommodate either a deadbreak bushing or a loadbreak bushing.

From the foregoing, it will be appreciated that in its most essential aspect, the present invention is a combination loadbreak and deadbreak temporary grounding device that includes a conductive body configured to accept a grounded bushing well; a grounded bushing well disposed through the body and having an inner end configured to slip onto a loadbreak mounting clip on a loadbreak mounting bracket and an outer end configured to accept either a loadbreak bushing or a deadbreak bushing for coupling, respectively, to either a loadbreak or deadbreak elbow connector; and a grounding cable electrically connected to the conductive body.

In embodiments, the present invention is a combination loadbreak and deadbreak temporary grounding device that includes a conductive housing having a cylindrical through hole, an integral mounting boss having a threaded throughbore, and a ground cable fitting for selective connection to a ground cable. A cylindrical bushing well is rotatingly secured in the conductive housing, the grounded bushing well configured with a cylindrical opening at its outer end that accommodates either a loadbreak bushing well insert or a deadbreak bushing well insert, and it includes an inner end that includes an annular channel for slipping onto the mounting clip of a loadbreak mounting bracket. A threaded mounting eye bolt disposed through the threaded throughhole has a head for engaging a loadbreak mounting clip on a first side and a deadbreak mounting clip on a second side.

The above disclosure is sufficient to enable one of ordinary skill in the art to practice the invention and provides an embodiment of several modes of practicing the invention presently contemplated by the inventors. While there is provided herein a full and complete disclosure of the preferred embodiments of this invention, it is not desired to limit the invention to the exact construction, dimensional relationships, and operation shown and described. Various modifications, alternative constructions, changes, and equivalents will readily occur to those skilled in the art and may be employed, as suitable, without departing from the true spirit and scope of the invention. Such changes might involve alternative materials, components, structural arrangements, sizes, shapes, forms, functions, operational features, or the like.

Therefore, the above description and illustrations should not be construed as limiting the scope of the invention, which is defined by the appended claims.

What is claimed as invention is:

1. A combination loadbreak and deadbreak temporary grounding device, comprising:
    a conductive body configured to accept a grounded bushing well and having a cable fitting for connection to a grounding cable; and
    a grounded bushing well disposed through said body and having an inner end configured to slip onto a loadbreak mounting clip on a loadbreak mounting bracket and an outer end configured to accept either a loadbreak bushing well insert or a deadbreak bushing well insert for coupling, respectively, to either a loadbreak or deadbreak elbow connector.

2. The combination loadbreak and deadbreak temporary grounding device of claim 1, wherein said grounded bushing well is rotatably inserted into said body.

3. The combination loadbreak and deadbreak temporary grounding device of claim 1, wherein said inner end of said grounded bushing well is configured with an annular channel to slip onto a loadbreak mounting bracket.

4. The combination loadbreak and deadbreak temporary grounding device of claim 1, further including a camming spring-loaded locking arm to secure a deadbreak elbow connector to a deadbreak bushing well insert when installed.

5. The combination loadbreak and deadbreak temporary grounding device of claim 1, wherein said cable fitting is a threaded boss for coupling to a grounding cable having a complementary threaded fitting.

6. The combination loadbreak and deadbreak temporary grounding device of claim 1, wherein said body is made from aluminum.

7. The combination loadbreak and deadbreak temporary grounding device of claim 6, wherein said body is a machined from a monolithic aluminum block.

8. The combination loadbreak and deadbreak temporary grounding device of claim 1, wherein said body is configured with a cylindrical opening for passage of said inner end of said grounded bushing well.

9. The combination loadbreak and deadbreak temporary grounding device of claim 8, wherein said grounded bushing well is rotatably inserted in said cylindrical opening in said body.

10. The combination loadbreak and deadbreak temporary grounding device of claim 1, wherein said grounded bushing well is fabricated from dielectric material.

11. The combination loadbreak and deadbreak temporary grounding device of claim 10, wherein said dielectric material is ethylene propylene diene monomer rubber.

12. A dual function loadbreak and deadbreak temporary grounding device, comprising:
    a conductive body having a throughhole, an integral mounting boss having a threaded throughbore, and a ground cable fitting for selective connection to a ground cable;
    a bushing well secured in said conductive housing, said grounded bushing well configured with a cylindrical opening at its outer end to accept rotatable and locking insertion of either a loadbreak bushing well insert or a deadbreak bushing insert, and having an inner end that configured for slipping onto the mounting clip of a mounting bracket; and
    a threaded mounting eye bolt disposed through said threaded throughbore in said mounting boss and having an eye end and a head for engaging the surface of a loadbreak mounting clip on an outer end and for slipping into a deadbreak mounting clip on a second side.

13. The dual function loadbreak and deadbreak temporary grounding device of claim 12, further including a camming spring-loaded bail to secure a deadbreak connecting elbow when a deadbreak bushing well insert is installed in said bushing well.

14. The dual function loadbreak and deadbreak temporary grounding device of claim 12, wherein said throughhole in said body is a threaded cylindrical throughhole.

15. The dual function loadbreak and deadbreak temporary grounding device of claim 14, wherein said bushing well is cylindrical and is rotatingly secured in said threaded cylindrical throughole.

16. The dual function loadbreak and deadbreak temporary grounding device of claim 15, wherein said inner end of said bushing well includes an annular channel configured for slipping onto the mounting clip of a loadbreak mounting bracket.

17. The dual function loadbreak and deadbreak temporary grounding device of claim 15, wherein said device is configured ergonomically such that said eye bolt is axially aligned with the axis of a hotstick connected to said eye end.

* * * * *